United States Patent [19]

Weiner

[11] 3,778,554

[45] Dec. 11, 1973

[54] SINGLE THREE-WIRE-PORT PBX INTERCOM TRUNK CIRCUIT ARRANGEMENT

[75] Inventor: David William Weiner, Boulder, Colo.

[73] Assignee: Bell Telephone Laboratories, Incorporated, Murray Hill, N.J.

[22] Filed: May 24, 1971

[21] Appl. No.: 146,243

[52] U.S. Cl. .......... 179/18 AD

[51] Int. Cl. .......... H04q 1/28

[58] Field of Search .......... 179/27 CA, 18 AD, 179/37, 18 BC, 39, 17 R, 17 A, 17 B, 17 D, 30, 71

[56] References Cited

UNITED STATES PATENTS

| | | | |
|---|---|---|---|
| 3,651,274 | 3/1972 | Angner et al. | 179/30 X |
| 1,307,981 | 6/1919 | Kurman | 179/70 |
| 2,690,478 | 9/1954 | Hauer | 179/18 C |
| 1,280,096 | 9/1918 | Stevens | 179/20 |
| 1,187,671 | 6/1916 | Stevens | 179/20 |

*Primary Examiner*—William C. Cooper
*Attorney*—Kenneth B. Hamlin and W. L. Keefauver

[57] ABSTRACT

A single three-wire-port PBX intercom trunk circuit supplies battery, ringing, and supervision through a switching network from the trunk circuit to a pair of interconnected stations. The intercom trunk circuit and line circuits of the stations are arranged to provide all essential controls for the calling and called stations.

Interconnections from the intercom trunk circuit to the stations are arranged so that talking current conducted to any one station is substantially independent of the loop resistance of any other station to which the one station is connected.

4 Claims, 8 Drawing Figures

FIG. 1
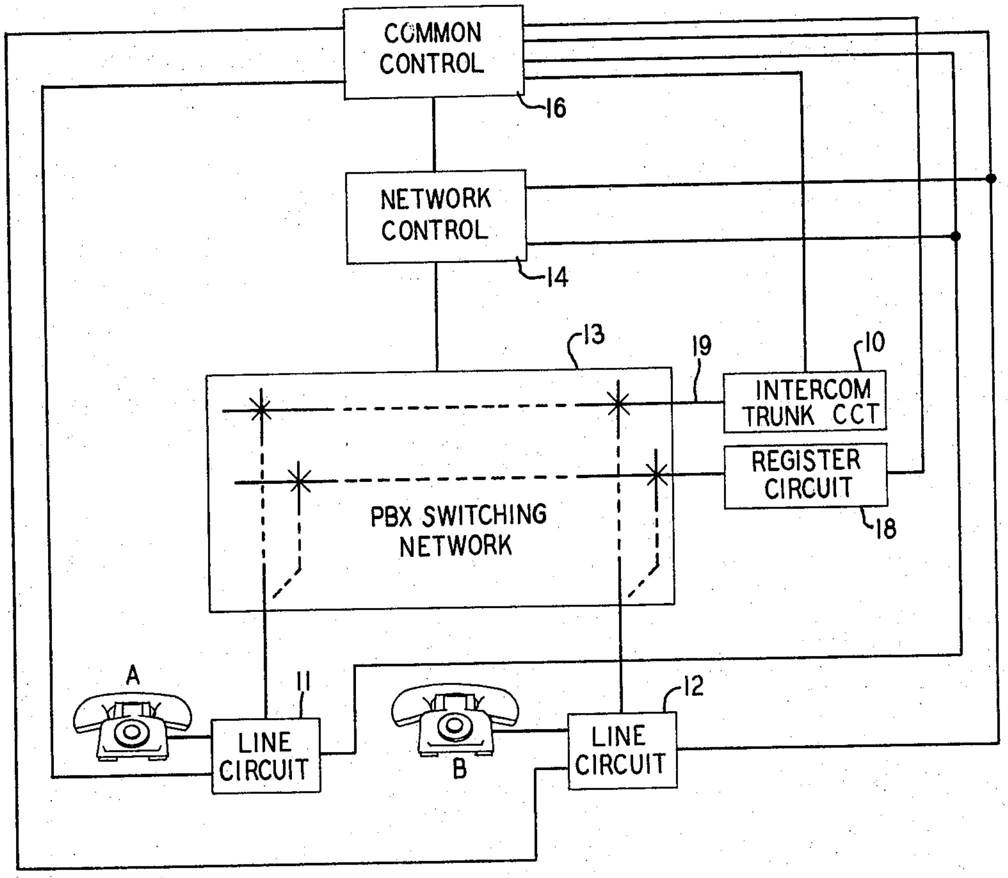
FIG. 6A
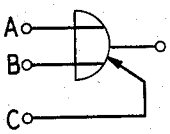
FIG. 6B
| A | B | C | OUT |
|---|---|---|---|
| 1 | X | OPEN | 0 |
| X | 1 | OPEN | 0 |
| 0 | 0 | OPEN | 1 |
| X | X | 0 | 1 |
X=DON'T CARE
FIG. 6C
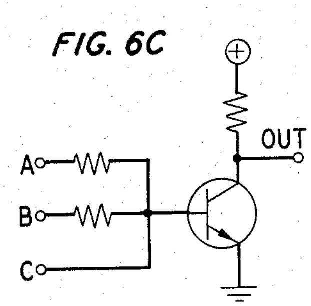
INVENTOR
D. W. WEINER
BY Richard B. Havill
ATTORNEY

SINGLE THREE-WIRE-PORT PBX INTERCOM TRUNK CIRCUIT ARRANGEMENT

BACKGROUND OF THE INVENTION

1. Field of the Invention

The invention is a telephone circuit arrangement that is more particularly described as a private branch exchange (PBX) intercom trunk circuit arrangement for controlling an interconnection between two stations of the exchange.

2. Description of the Prior Art

A PBX intercom trunk circuit is a common usage circuit for controlling station interconnections through the switching network of the PBX. The intercom trunk circuit supplies battery to interconnected stations, applies ringing signals to the called station, sends ringback signals to the calling station, distinguishes between the calling and called stations, and supervises each interconnection for determining when to release the connection in response to one station disconnecting.

In the prior art, most intercom trunk circuits are arranged to be connected by way of a six-wire port and a six-wire link through the PBX switching network to the line circuits of two PBX stations. Three of the six wires are used exclusively by the calling station and the other three wires are used exclusively by the called station.

It is desirable to use the same three leads from the intercom trunk circuit and through the switching network for connecting to the line circuits of both the calling and the called stations so that the size and cost of the required switching network can be reduced. Prior art attempts to use the same three leads for both the calling and called stations have resulted in circuit configurations which impair transmission between some stations of the PBX.

Transmission impairment occurs because the interconnected stations are bridged together and because output signals of conventional telephone transmitters vary with the magnitude of direct current supplied to the transmitter. As a result of the bridged connection, a low loop resistance of any one station can reduce the direct current supplied to another station to which the one station is connected. This reduction of the direct current supplied to the other station reduces the output of the transmitter of that station so much that the station having the low loop resistance receives inaudible signals.

If the station loop current for each PBX station were independent of the loop resistance of any station to which it is connected, this transmission impairment would not occur.

The problem therefore is to develop a PBX intercom trunk circuit arrangement in which the calling and called stations use the same three-wire link of the switching network to interconnect with the intercom trunk circuit and in which station to station transmission is substantially unimpaired by bridged loops.

SUMMARY OF THE INVENTION

It is an object of the invention to develop an improved PBX intercom trunk circuit arrangement.

It is another object to reduce the number of leads between a PBX intercom trunk circuit and the associated switching network.

It is a further object to provide a PBX intercom trunk arrangement in which a single three-wire-port intercom trunk circuit provides a substantially consistent magnitude of talking current to a first PBX station regardless of the loop resistance of a second station to which the first station is connected.

These and other objects of the invention are realized in a telephone switching system wherein the first and second stations are interconnected with a three-wire-port intercom trunk circuit by way of a switching network that provides separate talking current paths from the intercom trunk circuit to the first and second stations and that provides a common talking current return path from the first and second stations to the intercom trunk circuit.

It is a feature of the invention to interconnect the first and second stations with the three-wire-port intercom trunk circuit by means of the separate talking current paths from the intercom trunk circuit to the stations and by means of the common talking current return path from the stations to the intercom trunk circuit.

It is another feature to arrange a line circuit for conducting talking current to its associated station by way of one path when the station is a calling station and by way of a different path when the station is a called station.

It is a further feature to arrange the line circuit for conducting talking current from its associated station by way of one path whether the station is calling or called.

It is a still further feature to interconnect the three-wire-port intercom trunk circuit with the first and second stations by means for maintaining loop current to each station substantially independent of the loop resistance of the other station.

BRIEF DESCRIPTION OF THE DRAWING

A better understanding of the invention may be derived from the detailed description following if that description is considered with respect to the attached drawings wherein FIG. 1 is a block diagram of a PBX telephone system in accordance with the invention;

FIGS. 6A, 6B, and 6C, located on the sheet with FIG. 1, respectively show a logic gate symbol, its truth table, and a schematic diagram showing a circuit that accomplishes the logic function of the truth table.

DETAILED DESCRIPTION

Figure 2:
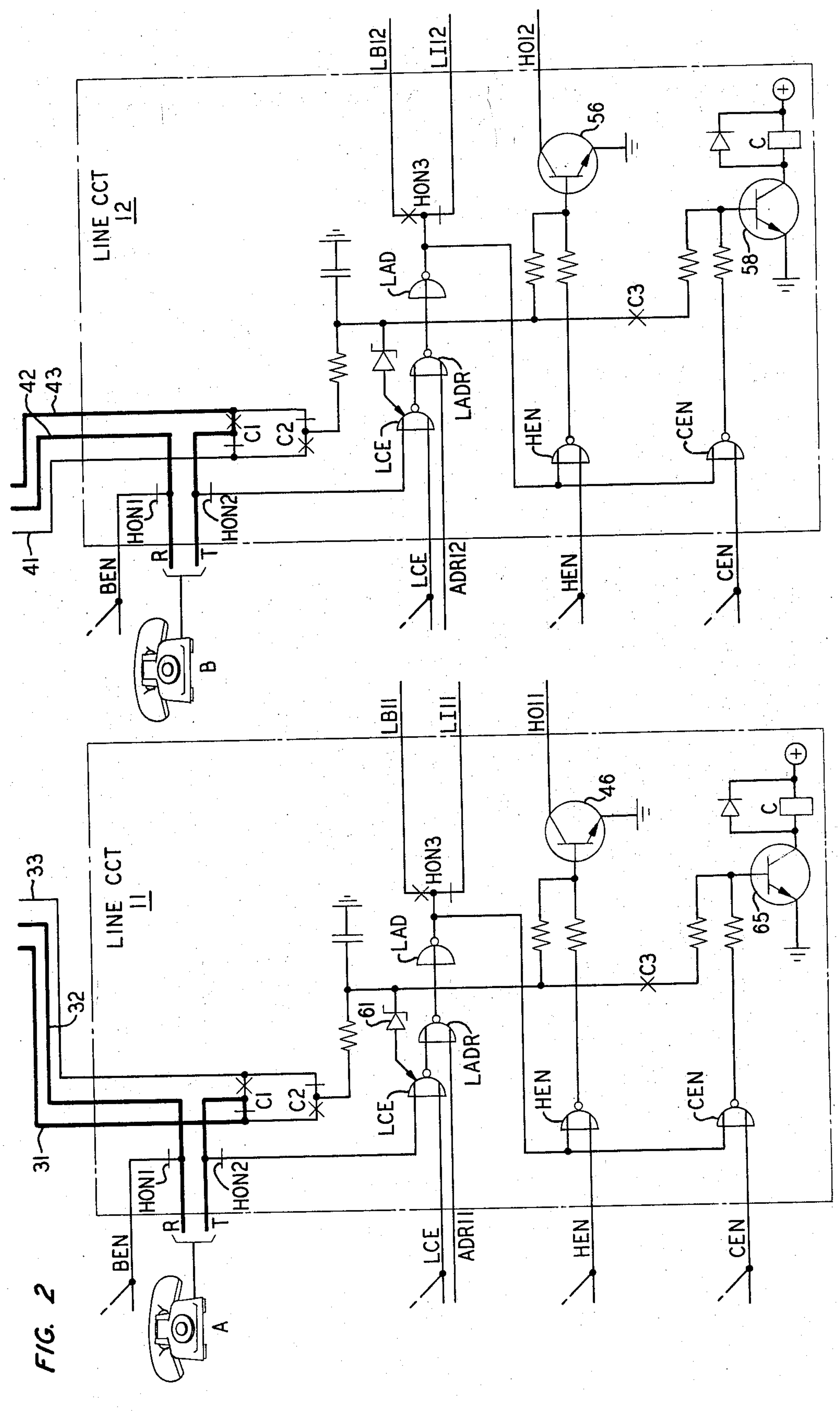
FIGS. 2, 3, and 4, when arranged in accordance with FIG. 5, form a composite schematic diagram of two separate line circuits, an intercom trunk circuit, and a switching network arranged in accordance with the invention.
Figure 5:
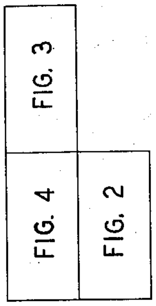

Referring now to FIG. 1, there is shown an intercom trunk circuit 10 which connects with line circuits 11 and 12 of telephone stations A and B by way of a PBX switching network 13 and which provides a means for interconnecting those stations in a talking circuit. The interconnection is established by a network control circuit 14 operating partially in response to signals from a common control circuit 16 and partially in response to signals from the line circuits 11 and 12. The common control circuit 16 operates partially in response to signals from a register circuit 18, partially in response to signals from the line circuits 11 and 12, and partially in response to signals from the intercom trunk circuit 10.

A PBX system which operates in response to a common control circuit is described in U.S. Pat. No. 2,949,506, issued to H. H. Abbott et al., on Aug. 16, 1960. Examples of typical PBX circuits not fully described herein may be found in the aforementioned patent.

The PBX switching network 13 is arranged so that it completes a connection between the line circuit 11 of exemplary calling station A and a three-wire-port 19 of the intercom trunk circuit 10 and completes a connection between the line circuit 12 of exemplary called station B and the same three-wire port 19. Only the three-wire-port 19 is required for connecting the intercom trunk circuit 10 to the PBX switching network 13 and therethrough to the line circuits of both stations A and B.

Figure 3:
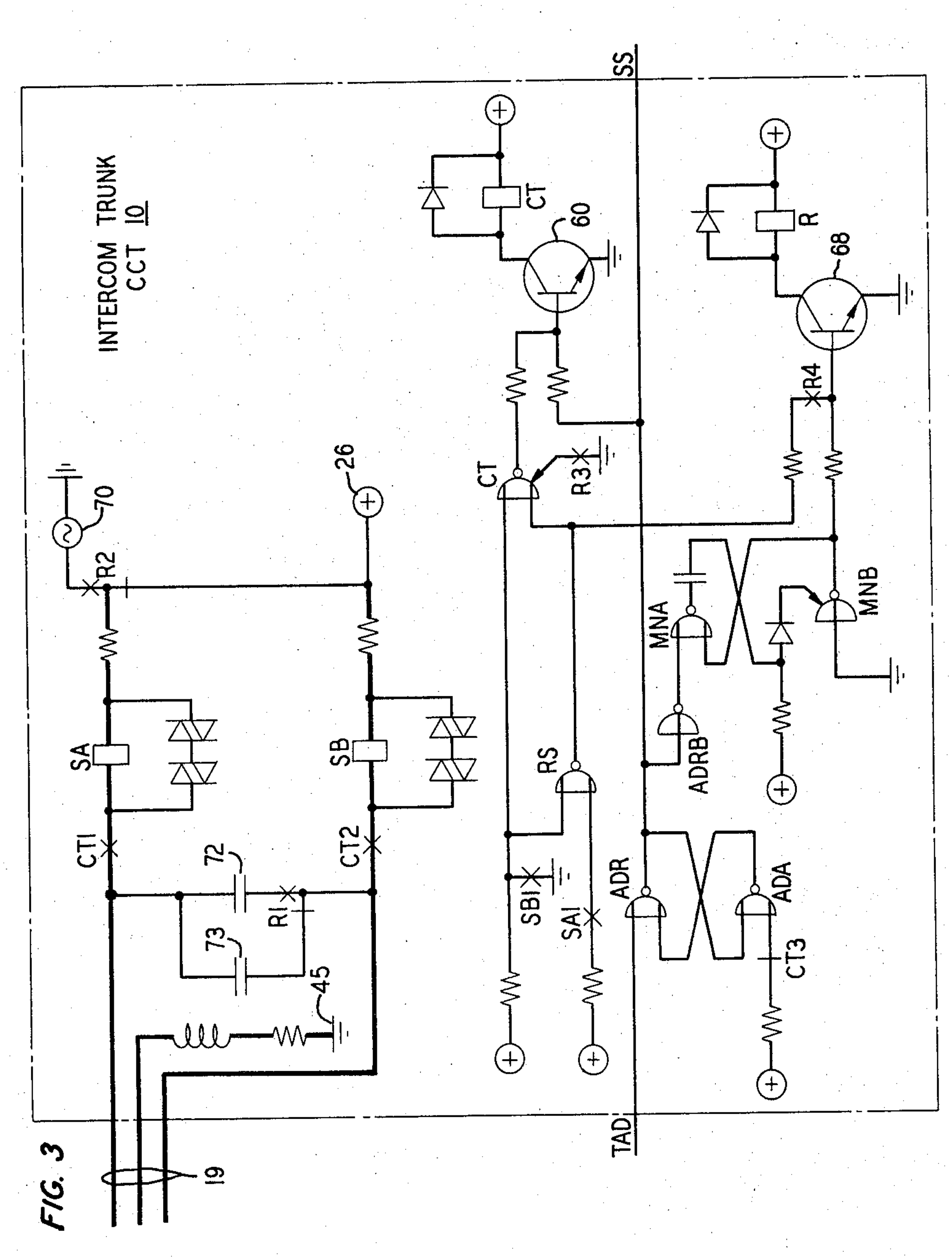
Figure 4:
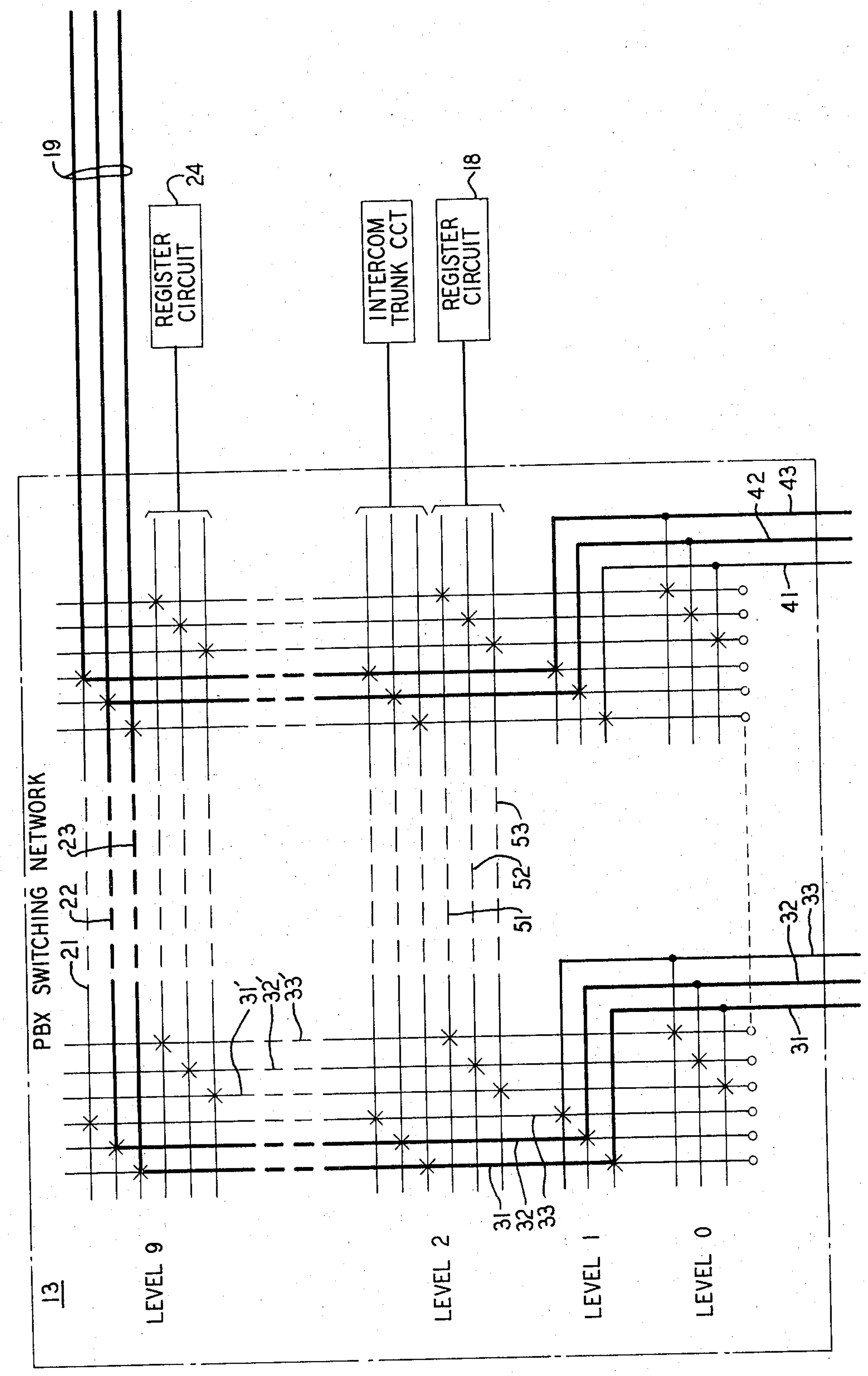

The circuit arrangement of FIG. 1 is shown in greater detail in the composite schematic of FIGS. 2, 3, and 4. FIG. 2 includes schematics of the line circuits 11 and 12 together with their associated stations A and B. FIG. 3 shows a schematic of the intercom trunk circuit 10 and logic controls included therein. FIG. 4 shows a piece of a schematic of the PBX switching network 13.

In the composite schematic, relay contacts are shown detached from their associated relays. Thus, the relay contacts are positioned in the schematic diagram wherever they conveniently occur and without regard to the schematic position of their associated relays. Each of the relay contacts, however, is labeled with a letter designator that correlates with the letter designator assigned to the relay which controls the contacts.

Briefly, the circuit of the composite schematic is arranged so that an exemplary intercom trunk circuit connection can be established between the PBX stations A and B and the three-wire-port 19 of the intercom trunk circuit 10 by way of a three-wire link including wires 21, 22, and 23 in the switching network 13. The intercom trunk circuit 10 is connected to the same three wires 21, 22 and 23 of the switching network 13 for calls in either direction between the stations A and B. Talking current is supplied from the intercom trunk circuit 10 to the transmitters of the stations A and B by way of two circuit loops. Magnitude of the talking current in each loop is substantially independent of the magnitude of the resistance of the other loop.

The PBX switching network 13 is a single stage crossbar switch comprising a matrix of normally open contacts. Each crosspoint of the matrix includes an intersection of six horizontal wires with six vertical wires. Each of the horizontal wires intersects with only one of the vertical wires at each crosspoint. An X is shown at the intersection of horizontal and vertical wires to indicate normally open contacts at the intersection.

None of the relays for operating the contacts of the network 13 is shown in FIG. 4, however, it is to be understood that there are select magnets for the horizontals and hold magnets for the verticals of the network 13. These magnets are well known in the art and are considered to be part of the network control circuit 14 of FIG. 1.

Normally, there are ten horizontal levels in a crossbar switch, but only the levels 0, 1, 2, and 9 are shown in FIG. 4. The crossbar switch is modified so that the eight levels 2 through 9 are split electrically to provide eight upper and eight lower three-wire links. Levels 0 and 1 are not multipled to form horizontal links. Instead, the crosspoints corresponding to levels 0 and 1 are used for steering. Three contacts of the crosspoints of the level 0 are multipled vertically to the lower three-wire link of each of the levels 2 through 9. Likewise three contacts of the crosspoints of the level 1 are multipled vertically to the upper three-wire link of each of the levels 2 through 9.

With this arrangement for steering, each operation of the crossbar switch requires two select magnets to be operated. Either the level 0 or the level 1 select magnet must be operated to connect one of the line circuits to the proper three-wire vertical multiple, and a select magnet associated with one of the levels 2 through 9 must be operated to close the connection through to the desired link.

The line circuits 11 and 12 are similar to each other and are arranged to connect the exemplary calling station A and the exemplary called station B, respectively, with vertical leads 31, 32, 33, and with vertical leads 41, 42, 43 of the switching network 13. There is logic circuitry included in the line circuits 11 and 12 for helping to establish the connection between the stations A and B and for helping to hold such connection once it is established.

A C-relay in each of the line circuits 11 and 12 plays an essential part in the advantageous intercom trunk circuit arrangement of this invention. On every intercom call, one C-relay rearranges the connection between its station lead T and the vertical leads of the switching network 13. Such a rearrangement is accomplished by the C-relay of the called station B because that C-relay is operated on intercom calls while the C-relay of the calling station A remains unoperated on such calls. Transfer contacts of the operated C-relay transfer the tip lead T of the called station B from connecting with the vertical lead 41 to connecting with the vertical lead 43.

The intercom trunk circuit 10 is arranged to apply talking current to the stations A and B, to supply ringing signals to the interconnected circuit, and to supervise the connection for determining when to release the connection. A direct current source 26 (FIG. 3) supplies talking current to the calling station A by way of horizontal lead 23, a crosspoint, the vertical lead 31, and the normally closed contact C1 of the line circuit 11 to the tip lead T and the transmitter of the station A. Source 26 supplies talking current to the called station B by way of horizontal lead 21, a crosspoint, vertical lead 43, and normally open contact C1 of the line circuit 12 to the tip lead T and the transmitter of the station B. Horizontal lead 22 provides a common return path from the transmitters and ring leads R of both stations A and B to ground 45 in the intercom trunk circuit 10.

The talking current supplied to the transmitter of the station A is relatively insensitive to the loop resistance of the station B because the two station loops are substantially independent. Likewise the talking current supplied to station B is relatively insensitive to the loop resistance of station A. The only common part of the loops is that portion of the loops including the wire 22 and associated components which couple that wire to ground 45.

If station B were calling station A rather than the station A calling station B, the interconnecting circuit would be identical with the just-described circuit except that the C-relay of line circuit 11 would operate and the C-relay of the line circuit 12 would remain unoperated. As a result, talking current would be supplied to the transmitter of station B by way of leads 23 and 41 and the normally closed contact C1 of line circuit 12. Talking current would be supplied to the transmitter of station A by way of leads 21 and 33 and the normally open contact C1 of line circuit 11.

It is important to understand the operating conditions for the arrangement and to understand the sequence of steps for interconnecting the stations A and B. Initially, the stations A and B are both on-hook with their station loops open-circuited at their hookswitches. At that time, neither station is connected through the switching network 13, and the C-relays of the line circuits 11 and 12 are not operated.

When the stations A and B are both on-hook, the common control circuit 16 of FIG. 1 is idle with respect to the stations A and B and applies control signals to the line circuits 11 and 12. A low signal is applied to the line circuit enable leads LCE of both line circuits. High signals are applied to the bid enable leads BEN, the hold enable leads HEN, the C-relay enable leads CEN, and the address leads ADR11 and ADR12 of the line circuits 11 and 12.

Flags are attached to each of the leads LCE, BEN, HEN, and CEN to show that leads having common designators are bridged together and receive like signals from the common control 16 at all times.

Address leads ADR11 and ADR12 are individual lines which are separately controlled by the common control.

In general, gates included in the schematic are conventional NOR gates, however, some gates such as the gates LCE are slightly different. They are similar to conventional NOR gates except that they include an additional override input. FIG. 6A shows a symbol used to represent the gates LCE. A truth table for this gate and a schematic of a circuit which achieves the logic of the truth table are shown respectively in FIGS. 6B and 6C.

In the line circuits 11 and 12, the gates LCE and LAD respond to signals applied to the line circuits and operate in their normally off states providing positive output signals. The positive output signal from each gate LAD is coupled through a normally closed contact HON3 to a line idle lead LI11 or LI12. At the same time, the gates LADR, HEN, and CEN are operating in their normally on states providing low output signals.

The high signals applied to the bid enable leads BEN of the line circuits 11 and 12 do not affect the line circuits 11 and 12 while the stations A and B remain on-hook.

While these previously mentioned conditions exist, the common control circuit 16 of FIG. 1 scans all of the associated line circuits of the PBX by applying a low signal to the address leads ADR11 and ADR12 one at a time in sequential order with other address leads of all line circuits in the exchange. As long as the stations A and B remain on-hook, the scanning of the line circuits 11 and 12 has no effect on the line circuits 11 and 12.

The connection sequence commences when station B remains On-hook, and station A goes off-hook closing a direct path around the loop through station A.

At this time the line circuit 11 requests the common control circuit 16 to connect line circuit 11 with a register in the following manner. The positive signal on lead BEN of the line circuit 11 is coupled, through the closed hold-off-normal contact HON1, the ring lead R, the closed hookswitch of station A, the tip lead T, and the closed hold-off-normal contact HON2 to the input of the line circuit enable gate LCE. IN response to this high signal, the gate LCE turns on and produces a low output signal.

When station A is scanned subsequently, the low output signal from the gate LCE and the low scan signal on the address lead ADR11 cause the line address gate LADR to turn off. A resulting positive output signal from the gate LADR causes gate LAD to turn on and produce a low output signal which is coupled through the normally closed hold-off-normal contact HON3 to the line idle lead LI11. This low signal on the lead LI11 is sent to the common control where the signal indicates that station A is requesting a connection to a register circuit.

In response to this request, the common control finds an idle register circuit, such as the register circuit 18, and signals that register to operate its select magnets in levels 0 and 2. Thus, the register circuit 18 is selected for connection to the calling station A.

At the same time, the common control 16 applies a high signal on the lead LCE for holding the gate LCE of line circuit 11. Although the gate LCE of line circuit 12 will turn on in response to the high signal on lead LCE, the gate LADR of line circuit 12 remains on because of the high signal on address lead ADR12.

After the select magnets of register circuit 18 operate, the common control circuit 16 of FIG. 1 changes from high to low the signals on the hold enable lead HEN for connecting the line circuit 11 to the register 18. In response to the low signals on the lead HEN and at the output of gate LAD of line circuit 11, the hold-enable gate HEN of line circuit 11 turns off. The gates LCE, LAD, and CEN of line circuit 11 remain on, and the gate LADR of that line circuit remains off. A positive output signal produced by the gate HEN of line circuit 11 turns on a transistor 46 which then provides a path to ground from the hold lead HO11 for operating the hold magnet of station A. When the hold magnet thus operates, a connection is established from station A through the line circuit 11, the vertical leads 31′, 32′, and 33′, the horizontal leads 51, 52, and 53 to the register circuit 18.

The hold-off-normal contacts HON1, HON2, and HON3, associated with station A, are operated by the hold magnet. When the contacts HON1 and HON2 are thus opened, the signal on lead BEN is removed from the input of the gate LCE, however, the high signal on the lead LCE continues to hold on the gate LCE. The gates LADR and LAD are held off and on respectively. The low output signal from the gate LAD in line circuit 11 is coupled through the normally open contact HON3 to the line busy lead LB11.

The connection of station A to the register circuit 18 is held because the register circuit 18 applies a positive potential over the leads 51 and 33′ and through the normally closed contact C2 to the input of the transistor 46. This positive potential maintains conduction through the transistor 46 so that hold lead HO11 is kept at ground potential for locking up the hold magnet of station A even though the gate HEN turns back on.

Station B, which remains on-hook, is not connected through the network 13 at this time. Since station B remains on-hook, the gate LAD Of line circuit 12 remains off and the gates LADR, HEN, and CEN of that line circuit remain on. The gate LCE of line circuit 12 remains on while the high signal is applied to the lead LCE. The low signal on lead HEN of line circuit 12 does not turn off the gate HEN of line circuit 12 because a high signal is still applied to the other input thereof by the gate LAD. As a result, transistor 56 remains off providing an open circuit between the hold lead HO12 and ground so that the hold magnet of station B does not operate and therefore does not connect station B through the switching network.

After station A is connected to the register 18, common control circuit 16 of FIG. 1 returns to idle and the register 18 supplies dial tone. The common control changes from low to high the signal on the hold-enable lead HEN. In response to the high signal from the gate LAD and the high signal on the lead HEN, the gate HEN in line circuit 11 turns on into a condition similar to the condition of the gate HEN of line circuit 12, which has been on. The select magnets for the register 18 now are released, and the register 18 applies dial tone to the station A by way of leads 52, 53, 31', 32', 31, 32, T and R. Station A then is enabled to dial the number assigned to station B. When the station A dials, the digits are stored in register 18.

After the station A has completed dialing, the register 18 requests the common control circuit to determine whether or not station B is idle by checking the state of line circuit 12. To initiate such a check, the common control circuit changes from low to high the signal on the line circuit enable lead LCE.

In response to the high signals on the lead LCE, the gates LCE of both line circuits turn on. The high signal on the leads ADR11 and ADR12 maintains the gates LAD on. Immediately thereafter and also in response to the request, the common control changes from high to low the signal applied to the address lead ADR12 of the line circuit 12 but maintains the high signal on the lead ADR11 of line circuit 11. As a result, the gate LADR of line circuit 12 turns off and produces a high output signal.

Gate LAD of line circuit 12 responds to the high signal from the gate LADR by turning on and producing a low output which is coupled through the normally closed contact HON3 to the line idle lead LI12 because station B is on-hook and not otherwise in service. This low signal on lead LI12 of line circuit 12 indicates to the common control that station B is idle.

If the station B were busy instead of idle, the contacts HON3 would be operated, and the low signal from the gate LAD would be sent to the common control by way of the line busy lead LB12.

After determining that station B is idle, the common control looks for an idle intercom trunk circuit, such as the trunk circuit 10. This is accomplished by scanning all of the trunk circuits in the exchange until the idle trunk circuit 10 returns a positive signal to the common control by way of a stop scan lead SS.

When idle, the trunk circuit 10 has the following operating conditions. Relays SA, SB, CT, and R are not operated. At the same time, the common control applies a positive signal to a trunk address lead TAD, turning on gate ADR and producing a low signal on the stop scan lead SS. Gates ADA, RS, CT, MNA, and MNB are all on, and gate ADRB is off. No power is supplied to the switching network leads 21 and 23 because the contacts CT1 and CT2 are normally open.

The common control scans the intercom trunk circuit 10 by applying a low signal to the lead TAD and thereby to one input of the gate ADR. Gate ADA, which is held on through a break contact CT3 of relay CT, produces a low signal that is applied to another input of the gate ADR. These concurrent low signals applied to gate ADR turn it off so that it sends a positive signal to the common control by way of the stop scan lead SS. This high signal occurring on the lead Ss while a low signal is being applied to the trunk address lead TAD of intercom trunk circuit 10 indicates to the common control that the intercom trunk circuit 10 is idle. As a result, the common control stops scanning and maintains the low signal on the address lead TAD.

Then the common control tells the intercom trunk circuit 10 to operate its select magnets.

After the intercom trunk select magnets are operated, the common control circuit connects the line circuit 12 through the PBX switching network 13 to the intercom trunk circuit 10 by operating the hold magnet of station B. This connection occurs because the common control now applies a low signal by way of the lead HEN to both line circuits. Since the gate LAD in the line circuit 12 is on and the gate LAD in the line circuit 11 is off, the gate HEN in line circuit 12 turns off; and the gate HEN in line circuit 11 remains on. As a result, the gate HEN in line circuit 12 applies a high signal to transistor 56 which turns on providing a path to ground for the hold lead HO12 and the hold magnet of station B.

With the hold magnet of station B operated, the leads 41, 42, and 43 of the line circuit 12 are connected by way of the switching network 13 and the leads 21, 22, and 23 to the intercom trunk circuit 10.

While the hold magnet of station B is being operated, the common control tells the line circuit 12 to operate its C-relay. To operate the C-relay, the common control changes from high to low the signal on lead CEN. Only gate CEN in line circuit 12 then turns off because low signals occur on the lead CEN and at the output of the gate LAD of line circuit 12. In response to a resulting high signal from the gate CEN, transistor 58 turns on and provides a path to ground for operating the C-relay of line circuit 12. Transfer contacts C1 of line circuit 12 transfer a connection of the tip lead T of station B from the lead 41 to the lead 43 when the C-relay is thus operated.

Referring back to the instant when the high signal is produced on the stop scan lead SS, it is noted that the high signal turns on the transistor 60 in the intercom trunk circuit 10. As a result, the relay CT operates and the contacts CT1 and CT2 close between the power supply 26 and the leads 21 and 23. Thus, when the hold magnet of station B operates as previously described, the line circuit of station B is connected by way of the leads 21 and 23 of the switching network to the power supply 26 in the intercom trunk circuit 10.

Current, initially conducted through the leads 23 and 41 and the normally open contact C2 of line circuit 12 to the inputs of the transistors 56 and 58, holds those transistors conducting and insures that the hold magnet and the C-relay of station B remain operated. This initial current is insufficient to operate the relay SB.

Because the station B hold magnet and C-relay are held operated by the intercom trunk circuit 10, the gates HEN and CEN in line circuit 12 can be turned on again. Therefore, the common control changes the signal on leads HEN and CEN to high. In response to these high signals, the gates HEN and CEN of line circuit 12 turn on. The gate HEN of line circuit 11 remains on.

Initially, no current is conducted through the relay SA, the leads 21 and 43, and the normally open contact C1 to the loop of station B because the hookswitch of the station B remains open. At this point the station A is off-hook with the line circuit 11 connected to the register 18, and the station B is on-hook with the line circuit 12 connected to the intercom trunk circuit 10.

Now the register 18 must be disconnected from station A so that station A can be connected to the station B and to the intercom trunk circuit 10. At this time, the common control changes from high to low the signal applied to the lead LCE, and the gates LCE are turned off. The hold-off-normal contacts HON1, HON2, and HON3 of both line circuits are operated because both hold magnets have been operated. The common control finds station A by requiring the register 18 to call back station A over the leads 51 and 33'. In doing so, the register 18 applies a high voltage to the lead 51 for breaking down the reverse breakdown diode 61 and turning on the gate LCE in line circuit 11. Gate LCE in line circuit 12, on the other hand, remains off.

The common control then scans to find station A. In scanning, the common control sequentially applies a low signal to the address leads ADR11 and ADR12 and to the address leads of all other station line circuits. When this low signal is applied to the lead ADR11 together with the already low signal from gate LCE, gate LADR of line circuit 11 turns off and gate LAD turns on. A resulting low signal from the gate LAD is coupled through the normally open contact HON3 to the line busy lead LB11, indicating that the station A is busy. This busy signal, occurring while the register is calling back to station A and while the common control is addressing station A, indicates that the calling station A has been found. Once the calling station is thus found, the common control changes from low to high the signal applied to the lead LCE. In response to the high signal applied to lead LCE, the gates LCE and LAD of line circuit 11 are held on and the gate LADR is held off.

In response to a command from the common control, register 18 now disconnects from station A by removing power from the lead 51. Transistor 46 turns off and releases the hold magnet of station A and therefore releases the hold-off-normal contacts HON1, HON2, and HON3 in line circuit 11. The low signal from gate LAD therefore is transferred from the line busy lead LB11 to the line idle lead LI11 and indicates to the common control that station A is disconnected from the register 18.

As soon as the hold magnet for station A releases the connection to the register, the common control commences to connect station A to the intercom trunk circuit 10. The common control now applies a low signal by way of the lead HEN to all line circuits. It should be recalled that gate LAD in line circuit 11 is on and that the gate LAD in line circuit 12 is off. In response to the low signals from the gate LAD and the lead HEN in line circuit 11, the gate HEN therein turns off. The high output of gate HEN turns on the transistor 46 and reoperates the hold magnet of station A.

Station A now is connected through the PBX switching network 13 to the intercom trunk circuit 10 which still is holding operated its select magnets. The intercom trunk circuits holds station A busy by conducting direct current through the relay SA, make contact CT1, leads 21 and 33 and the normally closed contact C2 in the line circuit 11 to hold the transistor 46 on.

The C-relay of line circuit 11 has not been operated because station A is the calling station. Therefore, the contact C3 is open and the transistor 65 is not turned on.

Now the stations A and B are both connected to the intercom trunk circuit 10, and the intercom trunk select magnets are released. Station A is off-hook and talking current is conducted therethrough by way of relay SB, normally open contacts CT2, leads 23 and 31, normally closed contact C1, the tip lead T, station A, the ring lead R, the leads 32 and 22 to ground 45.

The talking current delivered to station A by way of lead 23 plus the current conducted to the line circuit 12 by way of lead 23 for holding on the transistors 56 and 58 is sufficient to operate the relay SB in the intercom trunk circuit 10.

Now that both stations A and B are connected to and are held by the intercom trunk circuit 10, the common control again returns to idle by changing the signal on lead LCE from high to low and by changing the signal on lead HEN from low to high. The low address signals are removed from the lead ADR11 of line circuit 11 and from the lead TAD of the intercom trunk circuit 10.

With the common control now returned to idle, the intercom trunk circuit 10 commences to ring the station B. Ringing is initiated when the gate ADR in trunk circuit 10 turns on in response to the now high signal on lead TAD. A low output signal from gate ADR and an operated break contact CT3 turn off the gate ADA which produces a high signal for holding gate ADR on. The resulting low signal from gate ADR triggers a monopulser including gates ADRB, MNA, and MNB. The monopulser generates a positive 100-millisecond pulse at the output of the gate MNB. This pulse turns on transistor 68 and operates te ring relay R. With the relay R operated, transfer contacts R2 connect a ringing generator 70 through the relay SA to the lead 21. The ringing signal is an alternating current superimposed on a direct current which holds operated the hold magnet of station A.

Since the relay SB is operated and relay SA is not operated, the contact SB1 couples ground to one input of the gate RS and the other input of gate RS is open. As a result, the gate RS turns off and holds on the gate CT. By way of the now closed contact R4, the gate RS holds on the transistor 68. Transfer contact R1 connects a capacitor 72 between the leads 21 and 23. This capacitor couples ringing signals from the lead 21 to the lead 23 as a ringback tone for the station A. The capacitor 72 is sufficiently small to substantially attenuate the ringing signal coupled to the lead 23.

At this point the circuit is sending ringing signals to the station B by way of leads 21 and 43 and is sending ringback signals to station A by way of leads 23 and 31.

In addition to initiating ringing, the low signal from gate ADR in the intercom trunk circuit 10 removes the drive for holding on the transistor 60. This drive is replaced by a high signal from the output of the gate CT which turns off in response to the contact R3 having closed when the relay R operated. The transistor 60 then is held on by the signal from the gate CT, and the relay CT is held operated through the transistor 60 to ground.

Now either one of two events may occur. Station B may answer before station A hangs up, or station A may hang up before station B answers.

Assume first of all that station B answers before station A hangs up. When station B goes off-hook closing a path through its hookswitch, a conduction path is completed from the intercom trunk circuit 10 to station B for conducting talking current. This path initially conducts the direct current component from the ringing source 70 through the relay SA, the normally open contact CT1, the leads 21 and 43, the normally open contact C1, the tip lead T, the station B, the ring lead R, the leads 42 and 22 to ground 45. Sufficient current is conducted through this path to operate the relay SA.

When relay SA is thus operated, it closes contact SA1 and turns on the gate RS. A low signal then produced by the gate RS turns off the transistor 68 and releases the relay R. The low signal from gate RS and ground coupled through now closed contact SB1 cause the gate CT to remain off when the normally open contact R3 is released by relay R. When the relay R is released, the contacts R2 transfer the lead 21 from the ringing generator 70 to the direct current supply 26 which thereafter supplies talking and holding current to the station B. Simultaneously, transfer contacts R1 connect capacitor 73 in place of the capacitor 72 between the leads 21 and 23 for the talking circuit. The capacitor 73 has a very low impedance at audio frequencies.

Now the stations A and B are both off-hook and are conditioned to talk with each other under the supervision of the intercom trunk circuit 10. The talking path between the stations A and B includes a connection between the ring leads R of both stations by way of the lead 22 in the PBX switching network 13. In addition the tip leads T of the stations are interconnected for talking by way of the normally closed contact C1 of line circuit 11, the leads 31 and 23, the normally closed contact R1, the capacitor 73, the leads 21 and 43, and the normally open contact C1 of the line circuit 12.

If either of the stations hangs up, one or the other of the relays SA or SB will release.

Assuming that station A hangs up while station B remains off-hook, the relay SB releases opening the contacts SB1 and causing the gate CT to turn on. As a result, the transistor 60 turns off releasing the relay CT and the contacts CT1 and CT2 which cut off power to the line circuits and the hold magnets. Thus the connection between the stations A and B and the intercom trunk circuit 10 is terminated.

Assuming that station B hangs up while station A remains off-hook, the relay SA releases causing the gate RS to turn off. A high signal from gate RS turns on the gate CT. This, in turn, turns off the transistor 60 and releases the relay CT so that the contacts CT1 and CT2 interrupt the holding power, thereby terminating the connection between the stations A and B and the intercom trunk circuit 10.

Once the relay CT is released, the intercom trunk circuit 10 is idle and ready to make another connection when requested.

Assuming now that station A hangs up before the station B answers, the trunk circuit relays SB, CT, and R initially are operated and the relay SA is not operated. When the station A goes on-hook, the relay SB releases the contact SB1 and turns on the gate RS. In response to a low signal from the gate RS, the transistor 68 turns off and releases the relay R. Transfer contacts R2 terminate ringing, and the normally open contacts R3 are released permitting the gate CT to turn on. A resulting low signal from the gate CT causes the transistor 60 to turn off and release the relay CT. Contacts CT1 and CT2 interrupt the holding power. The hold magnets release and the stations A and B and the intercom trunk circuit 10 return to their idle conditions.

The foregoing description illustrates a PBX intercom trunk circuit arrangement requiring only three leads interconnecting the intercom trunk circuit 10 and both stations A and B. The loops to the stations are substantially independent of each other because their only common branch is the path from the lead 22 to ground 45 in the intercom trunk circuit 10. These separate loops insure that talking current conducted to the station A is substantially independent of the loop resistance to the station B and vice versa. Therefore, transmission between the stations A and B is not impaired by the magnitude of the loop resistance of either of the stations.

The foregoing detailed description is illustrative of one embodiment of the invention, and it is to be understood that additional embodiments thereof will be obvious to those skilled in the art. The embodiment described herein together with those additional embodiments are considered to be within the scope of the invention.

What is claimed is:

1. A telephone system comprising first and second stations having tip and ring leads, a trunk circuit for providing a talking current power supply and ground return, first means connecting the talking current power supply from the trunk circuit to the tip lead of the first station for conducting talking current to the first station, second means, exclusive of the first means, connecting the talking current power supply from the trunk circuit to the tip lead of the second station for conducting talking current to the second station, and means connecting the ring leads of the first and second stations in common to the ground return for conducting the talking current of the first and second stations to ground.

2. A system in accordance with claim 1 wherein the first means comprise a first path through a switching network and through a first line circuit, the second means comprise a second path through the switching network and through a second line circuit, and the first and second line circuits respectively including unoperated and operated relays for completing the first and second paths.

3. A system in accordance with claim 2 wherein magnitude of the talking current in the first path is substantially independent of a loop resistance of the second path from the trunk circuit to the second station, and magnitude of the talking current in the second path is substantially independent of a loop resistance of the first path from the trunk circuit to the first station.

4. In a telephone system a telephone station having tip and ring leads, a trunk circuit supplying suppluing talking battery at first and second terminals and for providing a ground return through a third terminal, a switching network having first, second, and third leads, each including a first end connected to the first, second, and third terminals respectively, means for connecting the ring lead to a second end of the third lead when the station originates a call and when the station receives a call, means for connecting the tip lead to a second end of the first lead when the station originates a call, the second lead concurrently providing a signal for holding the means for connecting the tip lead to the first lead, and means for connecting the tip lead to a second end of the second lead when the station receives a call, the first lead concurrently providing a signal for holding the means for connecting the tip lead to the second lead.

* * * * *

UNITED STATES PATENT OFFICE
CERTIFICATE OF CORRECTION

Patent No. 3,778,554 Dated December 11, 1973

Inventor(s) David William Weiner

It is certified that error appears in the above-identified patent and that said Letters Patent are hereby corrected as shown below:

Column 5, line 63, "On-hook" should read --on-hook--.

Column 6, line 5, "IN" should read --In--;

line 67, "Of" should read --of--.

Column 8, line 9, "Ss" should read --SS--.

Column 10, line 41, "te" should read --the--.

Column 13, line 1, after "circuit" insert --for--, after "supplying" delete "suppluing".

Signed and sealed this 9th day of April 1974.

(SEAL)
Attest:

EDWARD M.FLETCHER,JR.
Attesting Officer

C. MARSHALL DANN
Commissioner of Patents